(12) United States Patent
Ghrous et al.

(10) Patent No.: US 11,844,298 B2
(45) Date of Patent: Dec. 19, 2023

(54) MANAGEMENT OF THE DOSING OF INPUTS TO BE APPLIED TO AN AGRICULTURAL SURFACE

(71) Applicant: ALVIE 1, Paris (FR)

(72) Inventors: Nadir Ghrous, Paris (FR); Edita Bezegova, Paris (FR)

(73) Assignee: ALVIE 1, Paris (FR)

( * ) Notice: Subject to any disclaimer, the term of this patent is extended or adjusted under 35 U.S.C. 154(b) by 0 days.

(21) Appl. No.: 17/904,034

(22) PCT Filed: Feb. 12, 2021

(86) PCT No.: PCT/FR2021/050257
§ 371 (c)(1),
(2) Date: Aug. 11, 2022

(87) PCT Pub. No.: WO2021/160973
PCT Pub. Date: Aug. 19, 2021

(65) Prior Publication Data
US 2023/0076216 A1  Mar. 9, 2023

(30) Foreign Application Priority Data

Feb. 12, 2020 (FR) .................................... 2001387
May 20, 2020 (FR) .................................... 2005328

(51) Int. Cl.
*A01B 79/00* (2006.01)
*A01C 21/00* (2006.01)
*G01W 1/02* (2006.01)

(52) U.S. Cl.
CPC .......... *A01C 21/007* (2013.01); *A01B 79/005* (2013.01); *G01W 1/02* (2013.01)

(58) Field of Classification Search
CPC ..... A01C 21/007; A01B 79/005; A01B 79/02; A01B 77/00; A01B 76/00; G01W 1/02;
(Continued)

(56) References Cited

U.S. PATENT DOCUMENTS 6,750,898 B1 * 6/2004 Ishida .................. A01C 23/047
  382/110
9,756,773 B1 * 9/2017 Barbosa ............... A01B 79/005
(Continued)

FOREIGN PATENT DOCUMENTS

WO   WO-0010377 A1 *  3/2000  ........... A01B 79/005
WO   WO-0152160 A1 *  7/2001  ........... A01B 79/005
(Continued)

OTHER PUBLICATIONS

International Search Report from PCT/FR2021/050257 dated Feb. 12, 2021, 2 pgs.

*Primary Examiner* — Jeffrey P Aiello
(74) *Attorney, Agent, or Firm* — Tutunjian & Bitetto, P.C.

(57) ABSTRACT

A system for managing the dosing of inputs to be applied to a surface includes an electronic device housed on board an agricultural machine and a remote management server. The electronic device includes a weather sensor for measuring a weather condition, a central unit for collecting a weather datum containing information relating to the measured weather condition, and first communication means for transmitting the weather datum to the management server. The management server includes a processor for processing the weather datum and usage-specific data so as to generate a dosing recommendation for the inputs on the basis of a predetermined and learning dosing model, and second transmission means for transmitting the dosing recommendation to a communication terminal.

20 Claims, 2 Drawing Sheets

(58) Field of Classification Search
CPC ............... G01W 2203/00; G01W 1/06; G01W 2001/006; G01W 1/00; G06Q 50/02; G06Q 10/04; G06N 20/00; G06N 5/04; G06N 3/126; Y02A 40/10; Y02A 90/10; Y02A 40/22
USPC .............. 340/539.29, 572.1; 701/1, 50, 454; 702/2, 5, 182, 189
See application file for complete search history.

(56) References Cited

U.S. PATENT DOCUMENTS

| | | | | |
|---|---|---|---|---|
| 2005/0248454 | A1* | 11/2005 | Hanson | H04Q 9/00 340/539.22 |
| 2010/0070145 | A1* | 3/2010 | Foster | G05D 1/0278 701/50 |
| 2014/0379230 | A1* | 12/2014 | Koch | A01B 63/145 172/663 |
| 2019/0124826 | A1* | 5/2019 | Pickett | A01C 23/02 |
| 2020/0196512 | A1* | 6/2020 | Deng | A01B 63/002 |

FOREIGN PATENT DOCUMENTS

| | | |
|---|---|---|
| WO | 2019148138 A1 | 8/2019 |
| WO | 2001052160 A1 | 7/2021 |

\* cited by examiner

MANAGEMENT OF THE DOSING OF INPUTS TO BE APPLIED TO AN AGRICULTURAL SURFACE

TECHNICAL FIELD

The present invention relates to the technical field of agriculture, and more particularly to the field relating to the application of agricultural inputs, and in particular Plant Protection Products (or PPPs), to an area of agricultural land.

Agricultural inputs, or simply inputs as understood herein, refer throughout the following description to the various products added to the land and crops; generally, the inputs do not originate from the farm or the vicinity thereof. Such inputs do not occur naturally in the soil; they are added thereto to improve crop yields. These can be PPPs, phytosanitary products, biocontrol agents, adjuvants, fertilisers, soil amendments (elements that improve the physical and chemical properties of the soil, such as sand, peat or lime), or growth stimulants or retarders.

One purpose of the present invention is to improve the efficiency of the inputs to increase crop yields obtained over an area of agricultural land.

Another purpose of the present invention is to propose a solution intended to optimise the application of inputs, in particular PPPs, on an area of agricultural land by taking into account the very local and specific context at the time of application, and in particular the contextual spray data.

This consideration makes it possible to avoid certain drawbacks such as, in particular, the spread and/or diffusion of inputs onto neighbouring plots and/or the diffusion of inputs onto dwellings located near the area of land and/or the evaporation of droplets and/or the leaching of PPPs before reaching the site and/or before the substance takes effect (root, uptake by the plant, etc.) and/or the non-optimal interaction of the various active substances sprayed on the crops.

The very local and specific context is understood to mean, for example, the actual micro-meteorological conditions (during and after the application of inputs), as well as the soil types, the types of crops on the agricultural plots sprayed, the type of spraying equipment used and the agronomic properties of the active substances sprayed, and the quality of the water used to prepare the spray mixture.

This is also referred to as contextual spray parameters (or contextual spray data).

These different contextual parameters can vary significantly from one plot to another, even if they are close to one another. As regards the actual and local micro-meteorological conditions, for example, the Applicant has observed that a plot of land located on a south-facing slope is not subjected to the same ambient conditions as a neighbouring plot located on a north-facing slope. The present invention thus has numerous advantageous applications in the field of agriculture, including in particular viticulture, arboriculture or even field crops, by providing farmers with a predictive recommendation before preparing the input application, in real time during application and after application of the input, on the optimal dosages to be applied to an area of agricultural land based on the very local and specific context of the farm.

PRIOR ART

In order to choose the best windows for spraying inputs, in particular PPPs, farmers in most cases rely solely on the weather forecasts.

These forecasts are made using generic forecasting models for a given geographical area; they are also made for the most part in three-hour intervals and for the most precise in one-hour intervals.

However, these measurements do not have a sufficiently fine predictive interval and do not take into account agronomic specificities. More specifically, identical predictions are made for standard geographical areas of several square kilometres and are made using measurements at 2 metres above the ground for a grass cover.

They do not reflect the agricultural conditions of an orchard or a bare ploughed field for example. With current solutions, the choice of the one or more best spraying windows does not take into consideration other factors related to the very local context of the farm which has a direct impact on losses and agronomic degradation of the inputs.

Thus, it is still regrettable to note today that most farmers do not have the means to modulate the doses of inputs to be applied as a function of the conditions of the very local and specific context of the farm and in particular the actual microclimatic conditions during spraying.

This is in particular due to the lack of any precise weather forecasting model capable of providing spraying conditions and the lack of any intelligent system able to take into account all spraying parameters.

In order to determine the dose of inputs to be sprayed, farmers must settle for simply calculating the quantity of inputs to be applied based on the manufacturer's recommended doses and the surface area to be sprayed.

However, input management solutions for optimising the spraying of inputs on an area of agricultural land and which take into account the climatic conditions are known in the prior art.

The following main solutions exist among those identified:

so-called mobile weather stations which are installed on-board an agricultural machine; and
so-called fixed weather stations which are fixed relative to the area of agricultural land to be treated.

Mobile weather stations take the form of one or more sensors on-board agricultural machines such as sprayers; such machines can, for example, be a tractor towing a spray boom comprising a plurality of spray nozzles.

Such stations measure spraying conditions in real time. They are known, for example, in the Canadian patent document No. 2631237A1 and Australian patent document No. 2018205113A1. Typically, the measurements are recorded in the memory of the one or more sensors by means of a connected electronic box such as a data logger; they can also not be recorded.

Such stations must be connected to the tractor's electronic systems or spraying means and display the measurements on the tractor's console or on a monitor screen.

Known systems require a connection to a data bus line such as in the Canadian patent document No. 2631237A1.

However, such a connection to the data bus is not always available.

The installation of such a station on an agricultural machine is restrictive and requires the intervention of a specialised technician.

Moreover, the measurements made with these stations only provide raw data on the meteorological conditions: none of the solutions known to date provide the farmer with actionable advice so that he/she can personally manage the application of inputs.

Real-time data are not combined with the other data on the very local and specific context of the farm, nor are they used in the predictions for the optimal doses and windows for spraying inputs. Thus, these solutions can, in some cases, propose changing spraying parameters such as the nozzle type, agricultural machine speed, nozzle pressure or flow rate, but they do not change the quantity of product applied per hectare or make recommendations on the quantity of product to be used.

Fixed weather stations are anchored in the ground on or near the area of agricultural land to be treated.

Such stations are thus configured to measure the spraying conditions at a fixed location on the farm with a measurement frequency of between 15 minutes and 1 hour. These weather stations typically measure the relative humidity, temperature, wind speed, wind gusts and wind direction. However, as the Applicant has pointed out, it is important to note that the meteorological conditions on a farm are not uniform for all plots on the same farm.

More specifically, as explained in the preamble, there can be significant differences in relative humidity, temperature, wind speed and wind direction from one plot to another. These differences can be explained by exposure, relief and/or geology in particular.

Moreover, connected weather stations do not take into account the other parameters of the very local and specific context of the farm and they do not give any recommendation on the dose of input to be applied.

The Applicant submits that, for the above reasons, the techniques developed to date for managing the application of inputs, in particular PPPs, on an area of agricultural land according to the very local and specific context of the farm are not satisfactory.

SUMMARY OF THE INVENTION

The present invention aims to improve on the situation described hereinabove.

In particular, the present invention aims to overcome at least one of the different technical problems mentioned hereinabove by proposing an intelligent solution for managing and optimising input doses by taking into consideration the contextual spray parameters.

To this end, the present invention relates, according to a first aspect, to a method for managing the dosing of inputs, in particular PPPs, to be applied to an area of land by an agricultural machine comprising means for applying the inputs.

According to the present invention, the method is implemented by computer-based means and comprises the following steps:
- at least one measurement of a micro-meteorological condition in the ambient environment of the machine using at least one weather sensor on board the agricultural machine;
- a collection, using a central unit, of at least one meteorological datum containing at least one piece of information relating to the at least one micro-meteorological condition measured;
- a first transmission of the at least one meteorological datum collected to a remote management server;
- a remote processing of the at least one meteorological datum using the management server to generate a recommendation for the dosing of the inputs to be applied to the area of land based on a predetermined dosing model; and
- a second transmission of the recommendation generated to a communication terminal.

Preferably, the dosing model takes into account at least one contextual spray datum independent of said at least one measured meteorological datum in order to generate a dosing recommendation taking into account the actual spraying conditions.

Thanks to the succession of these different steps, which is characteristic of the present invention, the farmer has a weather station solution which is autonomous and connected to a remote server of the cloud type capable of processing the meteorological data collected and of enriching them with one or more additional parameters (or contextual spray data) on the very local and specific context of the farm (real local conditions of the area of agricultural land) according to a dosing recommendation model so as to provide the farmer, on a communication terminal of the smartphone type or equivalent, with an advice service to optimise his/her dosing of inputs in order to increase crop yields while limiting the potential risks linked to the inputs (overdosing, application on neighbouring plots or on residential areas, etc.).

Optionally, real-time input dose modulation via an ISO-BUS or Modbus connection is provided to optimise the input dosage in real time.

Advantageously, the method comprises a learning step.

The dosing recommendation can thus be made at the beginning of the treatment process with the inputs and afterwards optionally adjusted according to the actual conditions. For example, the recommendation can be generated from a modulation algorithm that is based on micro-meteorological data that are collected from the farm plots by an agricultural machine and other types of data (contextual spray data) that characterise the very local and specific context of the farm, such as one or more satellite images, at least one piece of the farmer's equipment (nozzle type, pressure, speed of operation) or the type of soil or a weather forecast.

In the embodiment that includes the use of the weather forecast, this forecast is compared with the measurement taken on the area of land to be treated.

This makes it possible to learn and improve when generating the next recommendation as well as to modulate the doses in real time.

Advantageously, the at least one measurement is taken dynamically when the machine is in motion.

In an advantageous embodiment, the at least one measurement is taken by a motion sensor connected to the weather sensor, the motion sensor providing information relating to the motion of the agricultural machine so as to control the at least one weather sensor.

Preferably, the motion sensor is of the accelerometer type and senses the vibrations generated by the vehicle when in motion.

Advantageously, during the first transmission step, the at least one meteorological datum can be transmitted to the management server in the form of data packets at specific intervals.

Preferably the intervals are between 30 seconds and 15 minutes, preferably 2 minutes.

Advantageously, the at least one meteorological datum also contains position information relating to a position of the machine on the area of land.

Such information can be provided, for example, by a GPS (Global Positioning System) module electronically connected to said weather sensor.

In an advantageous embodiment, the at least one meteorological condition measured contains at least one of the following pieces of information:
- a temperature; and/or
- a relative humidity; and/or
- an absolute mean wind speed; and/or
- an absolute gust speed; and/or
- a wind and/or gust direction; and/or
- an atmospheric pressure.

Advantageously, the micro-meteorological data are recorded and archived by the management server on a dedicated storage space.

Advantageously, the recorded and archived meteorological data are fed into a machine learning predictive algorithm aimed at enriching the dosing model.

This archiving thus allows the algorithm to be enriched and the deviations between the predictions and the sensor measurements to be evaluated in order to learn, using a learning algorithm, about the micro-climate of the plot and thus make more reliable meteorological predictions.

These semi-virtual stations, virtually present on all agricultural plots, are able to provide reliable micro-meteorological predictions and thus help provide the farmer with a reliable dosing recommendation in order to efficiently manage the application of inputs on an area of agricultural land while eliminating the biases stemming from a fixed weather station and avoiding the installation constraints stemming from a connection to the data bus of the agricultural machine. It should also be noted that contextual spray data can also be recorded and archived in order to feed the predictive algorithm and thus enrich the dosing model.

Advantageously, the input application means provide the central unit in real time with information relating to the actual application of the inputs, this input application information then being sent to the management server, which implements a detection algorithm capable of detecting, by comparison, a bias between the input dosing recommendations and the actual application of the inputs on the area of land.

The application means can also send some of the data related to the spraying context to the server using the same channel.

Advantageously, the dosing model takes into account several additional parameters of the very local and specific context of the farm in order to generate a dosing recommendation including the type of input to be applied and/or the type of application (by spraying for example) and/or the presence of biomass and/or the features and performance of the application means (nozzle type, nozzle colours, spray pressure, etc.) and/or the type of soil.

Advantageously, the dosing recommendation comprises information on a quantity and/or flow rate of inputs to be applied to said area of land.

Advantageously, during the treatment step, the dosing model can generate other recommendations such as the type of inputs to be applied on the area of land and/or the application means to be used, the possibility of adding adjuvants to mitigate bad meteorological conditions and to limit spray mixture losses.

Advantageously, the inputs to be applied are selected from the following: fertilisers, PPPs, phytosanitary products, biocontrol agents or biostimulation agents.

Advantageously, the communication terminal provides the dosing recommendation to the input application means via wireless communication means to control the application means so as to automatically dose the inputs to be applied.

Correlatively, according to a second aspect, the present invention relates to a computer program that comprises instructions suitable for executing the steps of the method according to the first aspect of the invention, in particular when the computer program is executed by at least one processor.

Such a computer program can use any programming language and be in the form of a source code, object code, or intermediate code between a source code and an object code, such as a partially compiled form, or in any other desired form.

According to a third aspect, the present invention relates to a computer-readable recording medium on which a computer program is stored, said computer program comprising instructions for executing the steps of the method according to the first aspect of the invention.

On the one hand, the recording medium can be any entity or device capable of storing the program. For example, the medium can include a storage means, such as a ROM, a CD-ROM or a microelectronic circuit-type ROM, or even a magnetic recording means or a hard drive.

On the other hand, this recording medium can also be a transmittable medium such as an electric or optical signal, such a signal being capable of being carried via an electric or optical cable, by conventional or wireless radio, or by self-steered laser beam or any other means. The computer program according to the invention can in particular be downloaded from an Internet-type network. Alternatively, the recording medium can be an integrated circuit into which the computer program is incorporated, the integrated circuit being suitable for executing or for use in the execution of the method in question.

According to a fourth aspect, the present invention relates to using the method as described hereinabove in the agricultural or viticultural field.

According to a fifth aspect, the present invention relates to a system for managing the dosing of inputs to be applied to an area of land by an agricultural machine comprising means for applying the inputs.

According to the invention, the system comprises an on-board device installed on said agricultural machine and a remote management server.

Advantageously, said device comprises:
- at least one weather sensor configured to measure at least one meteorological condition in the ambient environment of the machine;
- a central unit configured to collect at least one meteorological datum containing at least one piece of information relating to the at least one meteorological condition measured;
- first communication means configured to transmit the at least one collected meteorological datum to the management server.

Advantageously, the management server comprises:
- a processor implementing a predetermined dosing model configured to process said at least one meteorological datum with at least one contextual spray datum independent of said at least one measured meteorological datum to generate a dosing recommendation for said inputs to be applied on said area of land taking into consideration the actual spraying conditions.
- second transmission means configured to transmit the recommendation generated to a communication terminal.

Advantageously, the system further comprises means configured to implement the steps of the method as described hereinabove.

Preferably, the device is installed on-board a self-propelled agricultural machine, a mounted sprayer or a tractor towing a spray boom.

Preferably, the system comprises back-end backup capacities for storing and processing large volumes of data from the on-board weather station and external sources.

Thus, through its various functional and structural technical features described hereinabove, the invention provides the agricultural industry with an on-board solution to assist farmers with the dosing and application of inputs, in particular PPPs.

BRIEF DESCRIPTION OF THE FIGURES

Other features and advantages of the present invention will be better understood upon reading the description hereinbelow with reference to the accompanying figures, which illustrate an example embodiment devoid of any limiting features, wherein.

DESCRIPTION OF AN EMBODIMENT

A system for managing the dosing of inputs to be applied to an area of agricultural land and the method associated therewith will be described hereafter with reference to FIGS. 1 to 4.

As a reminder, one of the objectives of the present invention is to provide a recommendation for the dosing of inputs, in particular PPPs, to be applied on an area of agricultural land, which such recommendation must be precise and reliable while taking into account the actual meteorological conditions on said area of land and other parameters relating to the actual local conditions.

A further objective of the present invention is to avoid the need for a specialist technician to establish a connection between a module and the data bus of the electronic system of the machine, as is currently the case with the prior art mentioned hereinabove.

Yet another objective of the present invention is to be able to enrich the micro-meteorological data with external data representative of the actual local conditions of the area of land to be treated (contextual spray data).

Moreover, the objective is to introduce intelligent algorithms that can, from the micro-meteorological data and contextual spray data, calculate the optimal dose of input and in particular the PPPs to be used.

This is made possible in the example described hereinbelow.

In this example, an agricultural machine 200 of the following type is used:
- a self-propelled machine: family of sprayers for phytosanitary products intended for agricultural use. The traction means of this type of agricultural machine are integrated into the spraying structure;
- a mounted sprayer: such a sprayer is attached to a tractor when spraying in the fields; or
- an agricultural tractor towing a spray boom.

Such a machine 200 will be referred to in the description hereinbelow using the general term "sprayer".

In this example, such a sprayer 200 comprises input application means 210 configured to apply the inputs by spraying; for example, this can be means comprising a tank for storing the inputs and a spray boom along which spray nozzles are disposed, which spray nozzles can be electronically controlled by a central unit via a data bus (not shown here).

One of the underlying concepts of the present invention is to manage the dosing of the inputs as a function of the actual meteorological conditions and other parameters of the very local and specific context of the farm (contextual spray data) on the area of agricultural land to be treated. In the example described here and as illustrated in particular in FIG. 2, an electronic device 100 on-board the sprayer 200 is provided for this purpose.

Figure 3:
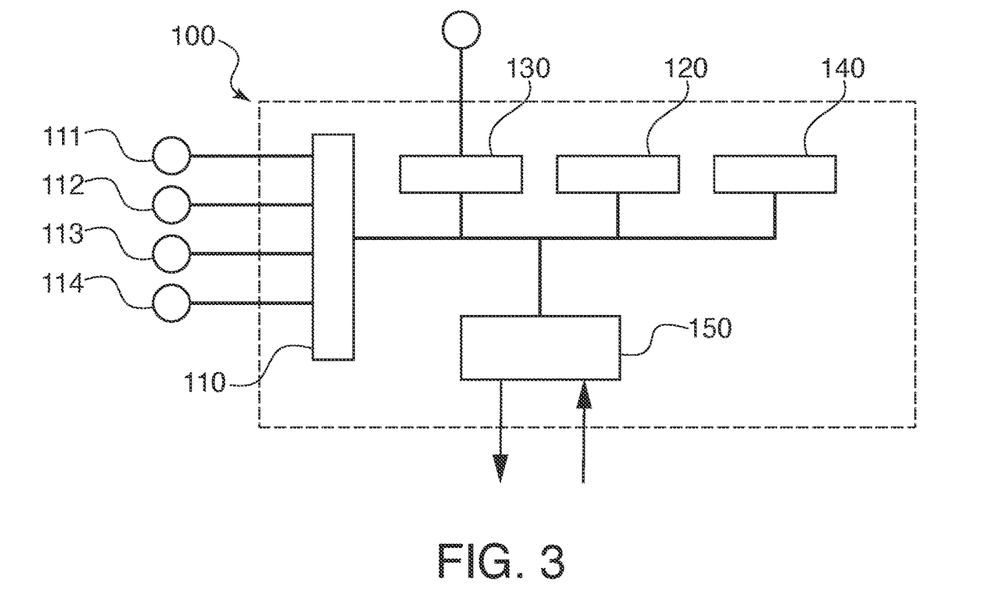
FIG. 3 is a diagrammatic view of an electronic device on-board a machine in accordance with FIG. 2.
Figure 4:
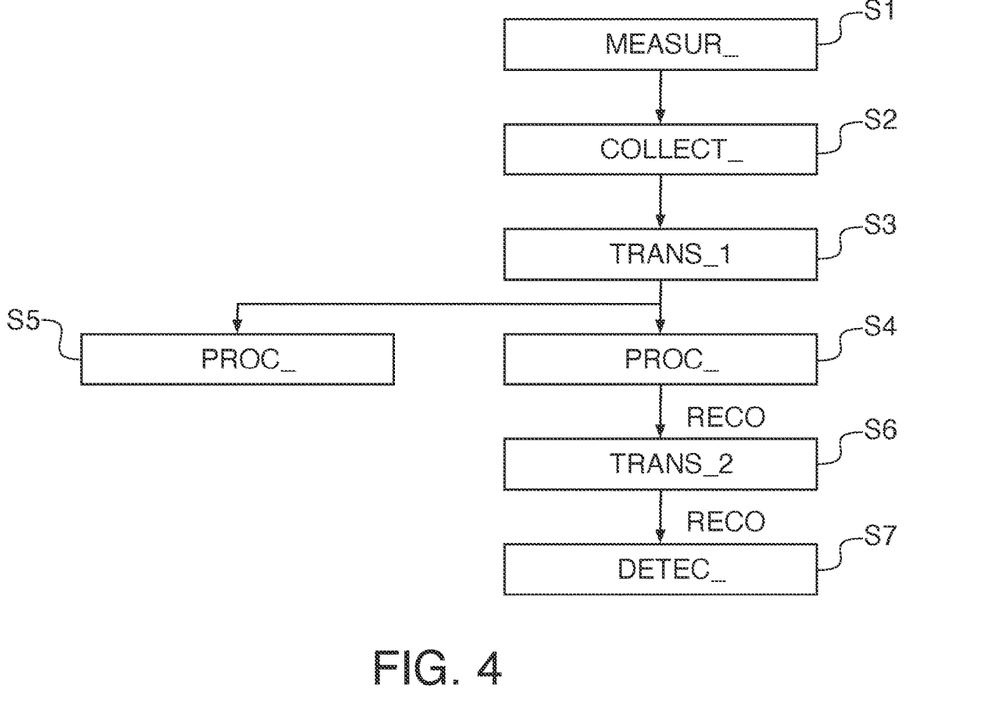
FIG. 4 shows a flow chart illustrating the different steps of a method for managing the dosing of inputs according to one example embodiment of the present invention.

In this example, the device 100 more particularly comprises a sensor module 110 shown in FIG. 3 comprising a plurality of weather sensors 111, 112, 113, 114, each of the sensors 111, 112, 113, 114 being capable of measuring at least one meteorological condition in the ambient environment of the sprayer 200.

The ambient environment is understood here to be the environment in the immediate vicinity of the sprayer.

In this example, the module 110 integrates:
- a temperature sensor 111 capable of measuring the temperature, and/or
- a humidity sensor 112 capable of measuring the relative humidity, and/or
- a wind speed sensor 113 capable of measuring the absolute mean wind speed and/or the maximum absolute gust speed and/or the wind and gust direction, and/or
- a pressure sensor 114 capable of measuring the atmospheric pressure.

In this example, a removable attachment system (not shown here) is provided to ensure a solid attachment of said module 110 and/or one of the sensors 111, 112, 113, 114 to said sprayer 200 while allowing for removal during, for example, phases of cleaning the sprayer with a pressure washer or when recharging the battery.

The attachment system thus ensures that real, unbiased weather measurements are taken.

The location of said module 110 and/or of one of said sensors 111, 112, 113, 114 can vary depending on the nature of the measurement being taken.

Thus, the location of the module 110 or of one of the sensors 111, 112, 113, 114 on said sprayer 200 involves the use of several types of attachment system such as, for example, a system of magnets when fastened to metal parts of the sprayer 200 or alternatively a "Velcro®" type hook-and-loop system when fastening to a plastic part of the sprayer 200.

One of the aspects of the present invention thus relates to the measurement S1 and collection S2 of meteorological data by these sensors 111, 112, 113, 114.

In the example described here, the on-board electronic device 100 thus comprises a plurality of sensors 111, 112, 113 and 114 which are each capable of measuring, in a step S1, at least one meteorological condition in the ambient environment of the sprayer 200.

By way of example, this is:
- a temperature measurement S1 taken by a temperature sensor 111 which measures a temperature in the ambient environment of the sprayer 200, a relative humidity measurement S1 taken by a humidity sensor 112 which measures the relative humidity in the ambient environment of the sprayer 200, a measurement S1 relating to the absolute mean wind speed and/or the maximum absolute gust speed and/or the wind and gust direction taken by a wind speed sensor 113 which measures these conditions in the environment of the sprayer 200, and/or an atmospheric pressure measurement S1 taken by a pressure sensor 114 which measures the atmospheric pressure.

It is understood here that each of the sensors operates autonomously or semi-autonomously and carries out a measurement according to its own measurement interval.

In this example, these measurements are preferably carried out dynamically, i.e. when said sprayer 200 is in motion.

Thus, a motion sensor 130 connected to said module 110 and/or to at least one of the sensors 111, 112, 113, 114 can be implemented in the device, said motion sensor 130 of the accelerometer type thus providing, in real time, information relating to the motion of the sprayer 200 in order to control at least one of the weather sensors 111, 112, 113, 114.

For example, such a motion sensor 130 is capable of sensing the vibrations generated by the sprayer 200 when in motion. Thus, when the sprayer 200 is started up, it generates vibrations: if these vibrations are greater than a given threshold value over a given period, then the one or more sensors 111, 112, 113, 114 are activated and each carry out the measurement S1. Conversely, when the sprayer 200 is stopped, the motion sensor 130 detects the absence of vibrations and the one or more sensors 111, 112, 113, 114 are deactivated.

In this example, these meteorological data can also be combined with position information relating to a position of the machine on the area of land. Such information is provided in this example by a GPS-type module 140 connected to said module 110.

This allows dynamic meteorological measurements to be taken along the entire path of the sprayer 200, plot by plot.

All of the meteorological measurements taken during this step S1 are then collected during a step S2 in the form of meteorological data D1 by the central unit 120 of the device 100.

These collected data D1 are then stored on a dedicated storage space (not shown here). The same storage space is used to store data on the very local and specific context of the farm (actual local conditions) which can often be the external data. This can be, for example, a volatile and/or non-volatile memory and/or a memory storage device which can comprise the volatile and/or non-volatile memory, such as an EEPROM, ROM, PROM, RAM, DRAM, SRAM, flash drive, magnetic disk or optical disk.

One of the other concepts underlying the present invention is to intelligently process and exploit the collected meteorological data D1 in real time, without having to connect the device 100 to the data bus line of the sprayer 200 (as has been the case to date with mobile weather stations), but by connecting it via communication means 150 to a remote management server 310 in the cloud to process the data D1 collected by the weather station and enrich them with external data (global weather model, satellite imagery, etc.) and farm-specific data to provide services and advice to farmers in particular for improving the use of inputs.

For this purpose, the device 100 comprises first communication means 150 which transmit the collected meteorological data D1 to the management server 310 in a step S3.

This transmission S3 takes place in the form of data packets at intervals of, for example, two minutes.

Figure 1:
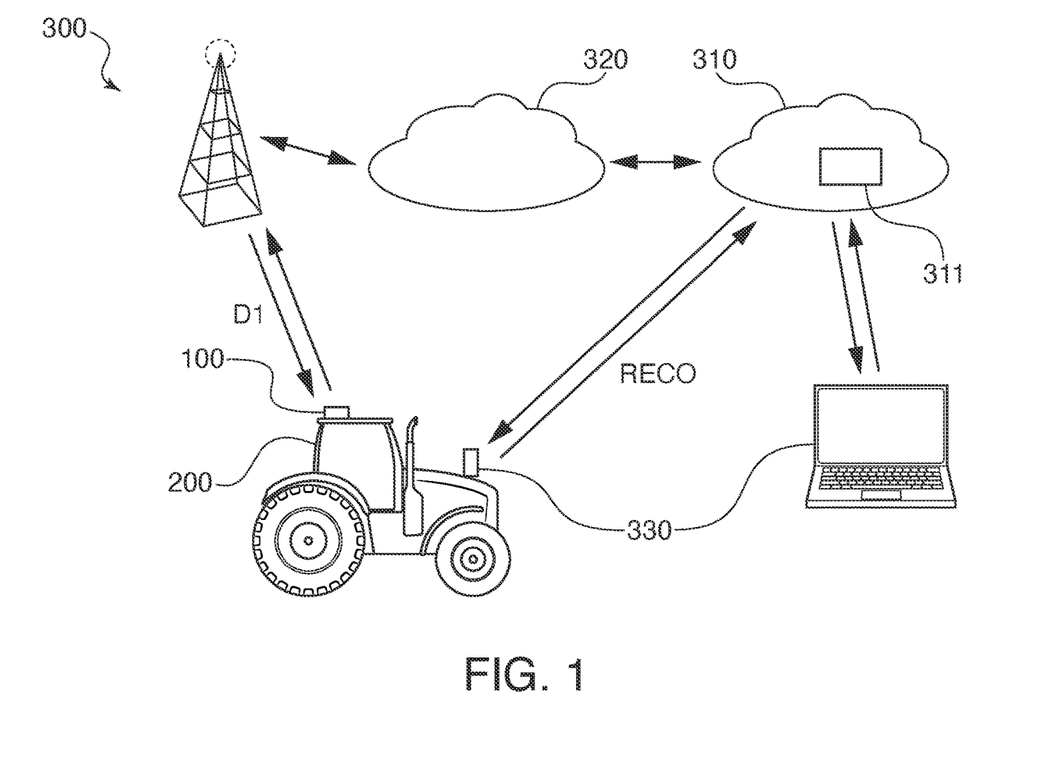
FIG. 1 is a diagrammatic view of a system for managing the dosing of inputs for an agricultural machine according to one example embodiment of the present invention.
Figure 2:
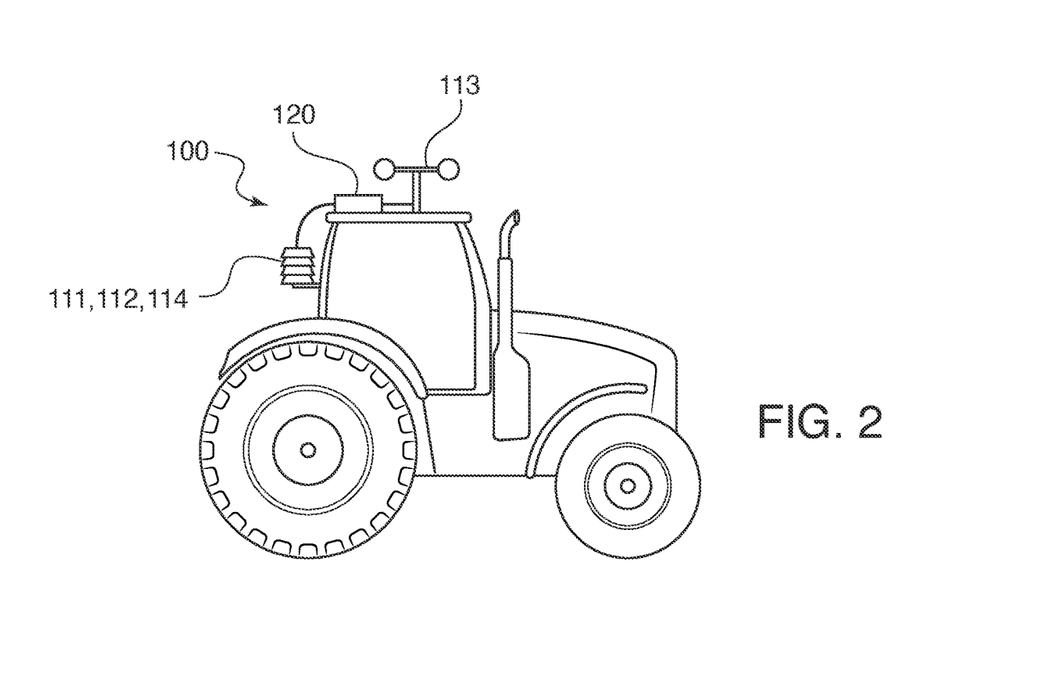
FIG. 2 is a diagrammatic view of an agricultural machine according to one example in accordance with FIG. 1.

In the example described here and as shown in FIG. 1, such a server 310 comprises a processor 311 capable of remotely processing such data D1, in a step S4, to generate a dosing recommendation RECO for the inputs to be applied to said area of land as a function of a predetermined dosing model. This generated recommendation RECO can include other information such as a quantity and/or flow rate of the inputs to be applied to the area of land.

It should also be noted that the dosing model can generate other recommendations such as the type of inputs to be applied to the area of land and/or the means of application to be used.

It is thus understood in this example that such a processor 311 implements a processing algorithm implementing an optimal window and dosing recommendation model capable of calculating an input dosage to be applied based on the data D1 and of providing lots of other advice.

This example provides for recording and archiving the meteorological data D1, in a step S5, on a dedicated storage space 320 connected to said management server 310. This can be, for example, a volatile and/or non-volatile memory and/or a memory storage device which can comprise the volatile and/or non-volatile memory, such as an EEPROM, ROM, PROM, RAM, DRAM, SRAM, flash drive, magnetic disk or optical disk.

Thus, the recorded and archived meteorological data D1 can feed a machine learning predictive algorithm, which uses the other data on the very local and specific context of the farm (actual local conditions), to enrich the dosing model and thus improve the harvest over time using the log.

In this example, the dosing model can also take into account several additional parameters when generating the dosing recommendation RECO.

Among these additional parameters, mention can be made in particular of the type of input to be applied and/or the type of application (by spraying or other means) and/or the presence of biomass and/or the characteristics of the agricultural plots and the performance levels of the application means.

The models used rely on the data generated by the sensor which are enriched by other data sources on the very local and specific context of the farm: satellite imagery, digital surface model, level of biomass in the plots, type of input, global meteorological predictions from several meteorological models, map of rivers, map of forests, nozzle type, boom height, and type of spraying equipment.

Based on this enriched data, several algorithmic models (micro-weather model, recommended input spraying window model, air quality algorithmic model, algorithmic model on agronomic recommendations for spraying parameters, model on input losses, harvesting model, fertiliser application model, application model and alerts on the risks of input product degradation after application and model on the application of root products according to soil moisture, model for modulating doses according to future climatic spraying conditions) allow results to be obtained which assist the farmer when making these decisions and/or with the need for traceability. A more accurate forecast of the meteorological conditions for each plot can be obtained thanks to the implementation of learning algorithms which, each time the sensor is used, will compare the data from the sensor with the data from global meteorological models to learn the specificities of the plot and its characteristics. The algorithm is thus intelligent and can adapt future meteorological predictions to the plot.

Once the recommendation RECO has been generated, it is transmitted, in a step S6, to a communication terminal 330 (laptop, tablet or smartphone) belonging to the farmer.

The latter can thus view this recommendation RECO and take it into consideration. The communication terminal 330 can also be provided such that it is capable of providing this dosing recommendation RECO to the input application means via an interface block on said device 100, which such interface block can comprise one or more of the following interfaces:
- a radio frequency RF interface, for example of the Bluetooth® or Wi-Fi®, LTE (Long-Term Evolution), or LTE-Advanced type (this interface can be assimilated to the wireless communication means given the reference numeral 150 in FIG. 3);
- a USB (Universal Serial Bus) interface;
- a HDMI (High-Definition Multimedia Interface).

The recommendation data RECO can, for example, be uploaded to the application means computer via the interface block using a Wi-Fi® network for example as per IEEE 802.11 or a mobile network such as a 4G network (or LTE Advanced network as per 3GPP release 10) or 5G network.

Such an embodiment allows the dosing of inputs, and in particular of PPPs, to be automatically controlled.

Alternatively or additionally, the input application means can provide said central unit 120 in real time with information relating to the actual application of said inputs, said input application information then being sent to said management server 310, which implements a detection algorithm capable of detecting S7, by comparison, a bias between the input dosing recommendations and the actual application of said inputs on the area of land.

Such an embodiment allows the application of the inputs actually applied to be controlled by comparing them with the provided recommendation RECO. If a bias is detected as a result of this comparison, a warning signal can be emitted from the farmer's terminal 330 for example.

Thus, the present invention, through the various functional and structural technical features mentioned hereinabove, offers, in the technical field of agriculture and the application of inputs (phytosanitary products, fertilisers, biocontrol or biostimulation agents, etc.), an innovative on-board solution for:
- improving the measurements of micro-meteorological conditions when spraying inputs to better identify the applications that would cause problems with neighbouring fields or nearby dwellings;
- forecasting and predicting micro-meteorological conditions for each plot and within each plot thanks to algorithms and verifications derived from the sensor data to help the farmer modulate the quantities of inputs to be used based on the application conditions and the very local context;
- tracking the interventions carried out in order to better assess the risk and the level of crop protection.

Thus, the solution proposed herein within the scope of the present invention makes it possible, in particular, to trace the interventions carried out by the farmer on his/her plots (crops, vines, arboriculture or truck gardening) and to evaluate the losses and degradations of the inputs, in particular PPPs, due to the application conditions and the very local application context. During the interventions, the on-board device measures the climatic conditions: temperature, relative humidity, wind speed and direction, and optionally the atmospheric pressure. Each measurement is associated with GPS coordinates for global positioning, then transmitted to our remote server implementing an algorithm capable of training a data model which aims to help the farmer to be more efficient with his/her interventions (in terms of cost and time) and to simplify certain administrative tasks in order to:
- optimise the use of inputs, particularly PPPs (reduce doses and/or improve the effectiveness of the inputs)
- reduce the negative externalities of the inputs on the environment,
- facilitate the relationship between farmers and the inhabitants of the dwellings adjoining the agricultural fields,
- monitor and trace the use of inputs for managing conflicts between farmers in the event of input drift between two fields,
- assess the risk of pollution for the farmer when using phytosanitary products,
- trace the use of inputs with the associated meteorological application conditions.

Thus, thanks to the implementation of such a solution, the Applicant submits that numerous applications can now be envisaged in this field, such as:
- helping optimise the spraying of inputs (mainly PPPs and fertilisers) in real time as a function of the climatic conditions and the very local and specific context of the farm,
- predicting micro-climates in order to better plan spraying windows and associated climatic conditions,
- reducing the use of phytosanitary products through improved modulation of doses as a function of the climatic spraying conditions and the very local context,
- helping manage the risk of disease by identifying plots with the highest risk of disease risk, because the inputs have not been applied under the right conditions—for example for biocontrol,
- monitoring air quality in rural regions with regard to phytosanitary products that drift in the air,
- helping manage conflicts with neighbours (legal disputes) and farmers by accurately measuring spraying conditions,
- providing traceability for the quality of the input applications,
- providing agronomic and technical advice on the spraying parameters (nozzle type, pressures, adjuvant, boom height, spray speed, flow rate) in relation to forecast and actual meteorological conditions,
- helping estimate the quantities of inputs lost through evaporation and/or drift,
- helping choose the best spraying windows for biocontrol agents according to meteorological and agronomic criteria and the very local and specific context of the farm,
- identifying the optimal application conditions for inputs according to the very local context and the specificities of the farm: the product sprayed, the crop, the characteristics of the field, the area of land to be treated, the climatic conditions, the flow rate, the nozzle type, the sprayer type (boom width), the work rate, the presence of biomass and other conditions,
- tracking the spray quality in the event of a dispute with insurers,
- analysing the micro-climates to improve partial harvest of a plot (vines),
- providing advice on application conditions for fertilisers to avoid post-application necrosis,
- providing application advice and alerting to the risks of post-application degradation of inputs due to unfavourable development of weather conditions (thermal amplitude, rain),
- providing advice on the application of root products as a function of soil moisture, recording interventions with associated application conditions and automatic coordination with plot management software (transfer of data on interventions to other software and vice-versa).

It should be noted that this detailed description concerns one specific example embodiment of the present invention, however in no way does this description limit the subject matter of the invention in any way: on the contrary, it aims to remove all possible imprecisions or all incorrect interpretations of the claims provided hereafter. It should also be noted that the reference signs placed in brackets in the claims provided hereafter are in no way limiting; the sole purpose of these signs is to improve the intelligibility and understanding of the claims provided hereafter, in addition to the desired scope of protection.

The invention claimed is:

1. A method for managing a dosing of inputs to be applied by an agricultural machine to an area of land, said agricultural machine including means for applying said inputs, said method being implemented by computer-based means and comprising:
   at least one measurement of a micro-meteorological condition in an ambient environment of said agricultural machine using at least one weather sensor on board said agricultural machine;
   a collection, using a central unit, of at least one meteorological datum containing at least one piece of information relating to said at least one micro-meteorological condition measured;
   a first transmission of said at least one meteorological datum collected to a remote management server;
   a remote processing of said at least one meteorological datum collected using said management server to generate a dosing recommendation for the dosing of said inputs to be applied to said area of land based on a predetermined dosing model;
   a second transmission of said dosing recommendation to a communication terminal; and
   applying said inputs by spraying said inputs on the area of land according to said dosing recommendation using a sprayer positioned on the agricultural machine,
   wherein the dosing model takes into account at least one contextual spray datum, including weather forecasts, independent of said at least one measured meteorological datum in order to generate the dosing recommendation taking into account actual spraying conditions.

2. The method according to claim 1, wherein said at least one contextual spray datum comprises at least one selected from a group consisting of:

data originating from one or more predictive meteorological models;

data on an input type to be applied;

data on an application type;

data on a presence of biomass;

data on features and performance levels of the means for applying said inputs; and data on specificities of the area of land such as a soil type, orientation of the area of land or geology of the area of land.

3. The method according to claim 1, wherein the at least one measurement is taken dynamically when said machine is in motion.

4. The method according to claim 3, wherein the at least one measurement is taken by a motion sensor connected to said weather sensor, said motion sensor providing information relating to the motion of said agricultural machine so as to control said at least one weather sensor.

5. The method according to claim 4, wherein said motion sensor is of an accelerometer type and senses vibrations generated by said agricultural machine when in motion.

6. The method according to claim 1, wherein, during the first transmission, said at least one meteorological datum can be transmitted to the management server in a form of data packets at specific intervals.

7. The method according to claim 6, wherein the specific intervals are between thirty seconds and fifteen minutes, preferably five minutes.

8. The method according to claim 1, wherein said at least one meteorological datum also contains position information relating to a position of said machine on said area of land.

9. The method according to claim 1, wherein said at least one micro-meteorological condition measured contains at least one selected from a group consisting of:

a temperature;

a relative humidity;

an absolute mean wind speed;

an absolute gust speed;

a wind and/or gust direction; and an atmospheric pressure.

10. The method according to claim 1, wherein said at least one meteorological datum is recorded and archived on a dedicated storage space connected to said management server.

11. The method according to claim 10, wherein said at least one recorded and archived meteorological datum is fed into a machine learning predictive algorithm aimed at enriching the dosing model.

12. The method according to claim 1, wherein the means for applying the inputs can provide said central unit in real time with information relating to actual application of said inputs, said input application information then being sent to said management server, which implements a detection algorithm capable of detecting, by comparison, a bias between the dosing recommendation and the actual application of said inputs on said area of land.

13. The method according to claim 1, wherein the dosing recommendation comprises information on a quantity and/or flow rate of inputs to be applied to said area of land, and/or information on an adjuvant to be added in order to mitigate bad meteorological conditions and limit spray mixture losses.

14. The method according to claim 1, wherein the remote processing comprises generating, using the dosing model, other recommendations such as a type of inputs to be applied to the area of land and/or the means of application to be used.

15. The method according to claim 1, wherein said inputs to be applied include at least one selected from a group consisting of: PPPs, fertilisers, phytosanitary products, biocontrol agents and biostimulation agents.

16. The method according to claim 1, wherein the communication terminal provides the dosing recommendation to the means for applying said inputs via an interface block in order to control the dosing of said inputs.

17. A non-transitory computer-readable recording medium on which a computer program is recorded, said computer program comprising instructions for executing the method according to claim 1.

18. A system for managing dosing of inputs to be applied to an area of land by an agricultural machine having means for applying said inputs, said system including an on-board electronic device installed on said agricultural machine and a remote management server, wherein said on-board electronic device comprises:
- at least one weather sensor configured to measure at least one meteorological condition in an ambient environment of said machine;
- a central unit configured to collect at least one meteorological datum containing at least one piece of information relating to said at least one meteorological condition measured;
- at least one motion sensor configured to detect vibrations generated by the means for applying said inputs of said machine during use, the at least one weather sensor being automatically activated responsive to the vibrations detected being greater than a threshold value; and
- a first communication means configured to transmit said at least one collected meteorological datum to said management server;

wherein the management server comprises:
- a processor implementing a predetermined dosing model configured to process said at least one meteorological datum with at least one contextual spray datum independent of said at least one measured meteorological datum to generate a dosing recommendation for said inputs to be applied on said area of land taking into consideration actual spraying conditions; and
- a second communication means configured to transmit said dosing recommendation to a communication terminal.

19. The system according to claim 18, further comprising means configured to implement the method according to claim 2.

20. The system according to claim 18, wherein said on-board electronic device is installed on-board a self-propelled agricultural machine, a mounted sprayer or a tractor towing a spray boom.

* * * * *